July 2, 1968  H. HENNE  3,390,585
DRIVE FOR ROTATING DRUMS
Filed April 18, 1966
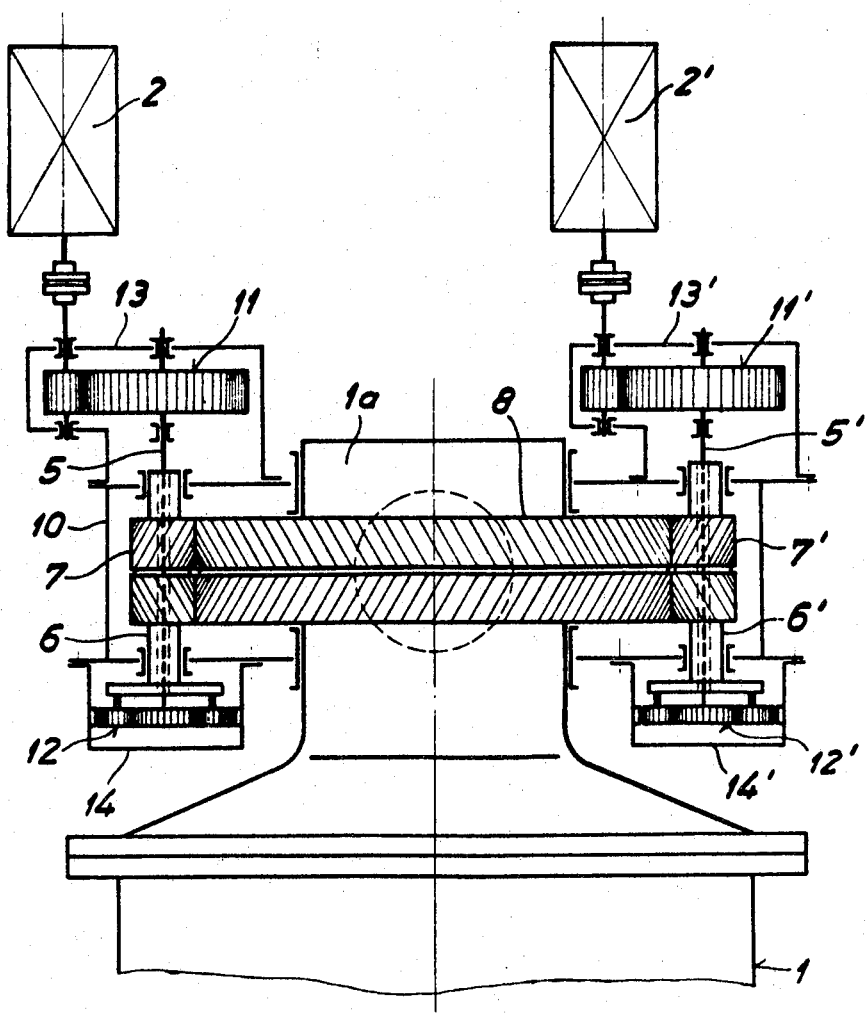

3,390,585
DRIVE FOR ROTATING DRUMS
Heinrich Henne, Ennigerloh, Westphalia, Germany, assignor to Polysius G.m.b.H., Neubeckum, Westphalia, Germany
Filed Apr. 18, 1966, Ser. No. 543,313
Claims priority, application Germany, May 26, 1965, P 36,896
1 Claim. (Cl. 74—410)

ABSTRACT OF THE DISCLOSURE

A drive for a rotating drum, comprising at least one driving motor, a toothed wheel which surrounds the neck of the drum and has at least one pinion in driving engagement therewith, two stages of reduction gearing for each such pinion, arranged on axially opposite sides of the toothed wheel, the first stage being driven by the motor and the second stage being connected to drive the pinion, and a torsion shaft through which the first stage drives the second stage and which passes through the pinion.

Background of the invention

This invention relates to a drive for rotating drums, especially tube mills, having at least one drive motor, at least two stages of reduction gearing and at least one torsion shaft, for driving through a pinion on the gear rim of a collecting gear.

With rotating drums, e.g. tube mills, in order that the drum neck may be kept free even on the drive side of the drum for inserting or extracting material, two-way drives have been developed wherein two drive shafts laterally displaced from the drum axis are provided, each operating via a pinion on the gear rim of a common collecting gear. The two said shafts may be driven by separate drive motors, or by a common drive motor if a branching gearing is interposed. It is also possible (e.g. with small loadings) and with basically the same construction, to drive the gear rim from one pinion shaft only.

One of the main problems in designing such two-way drives is uniform division of torque between the two drive trains. Various proposals have been made for this purpose. Thus in a drive with a single drive motor and a series branching gearing it is known to provide balancing elements; e.g. a differential, in the series gearing in order to divide the torque uniformly between the two drive shafts.

It is also known to form the two drive shafts as torsion shafts in order to achieve automatic torque balance. This method has the inherent advantage of constructional simplicity. Its disadvantage however is that because of the torsion shaft length needed for sufficient spring action the length of the whole drive is undesirably great.

Summary of the invention

The object of the invention is therefore to provide a drive of the type described which avoids the defects mentioned. According to the invention this object is achieved by a novel construction in which the torsion shaft extends through a hollow pinion shaft and forms the driving connection between two stages of reduction gearing, the first of which is driven by the drive motor and the second of which drives the pinion shaft, the two stages of reduction gearing being arranged on axially opposite sides of a toothed wheel which surrounds the neck of the drum and which is in engagement with a pinion fixed on the hollow pinion shaft.

The main advantage of a construction embodying the invention is that in spite of a great length of the torsion shaft and the resulting good rotary and longitudinal elasticity, the entire structure is of very compact construction. A highly elastic connection is especially important when using planetary gearing.

In a drive according to the invention, the reduction series gearing is in two stages which are disposed on opposite sides of the collecting gear, and the torsion shaft forms the connection between these two stages.

If in such a construction the series gearing housings are flanged to the collecting gear housing, the disposal of the two series gearings on opposite sides of the collecting gear effects weight balancing, which is of particular advantage if the collecting gear is mounted on ball bearings.

Details of the invention will be apparent from the following description of a preferred embodiment of the invention.

Brief description of the drawing

The drawing is a plan view of a tube mill drive embodying the invention.

Description of the preferred embodiment

The drawing shows one end of a tube mill 1 driven by two drive motors 2, 2'. Each of these motors acts via a coupling to drive series reduction gearing consisting of two stages, the first stage 11 or 11' comprising spur gearing and the second stage 12 or 12' comprising planetary gearing. The second stage drives a pinion shaft 6 or 6', which carries a double pinion 7 or 7' provided with herringbone teeth.

The two pinions 7, 7' driven by the drive motors 2, 2' act on the gear rim 8 of a collecting gear wherein the drum neck 1a is mounted and which itself is mounted by means of ball bearings on the base.

Torsion shafts 5, 5' pass through the hollow pinion shafts 6, 6' and connect the two stages 11, 12 or 11', 12' of the series reduction gearing. In this manner the constructional length of the drive is short in spite of the relatively great length of the torsion shafts 5, 5'.

In the illustrated embodiment the two stages of series reduction gearing are different, the first stage 11 or 11' comprising spur gearing and the second stage 12 or 12' comprising planetary gearing. An alternative construction is however possible wherein both stages of the series gearing comprise planetary gearing.

The two stages 11 and 12 or 11' and 12' of the series gearing are disposed on opposite sides of the collecting gearing formed by the pinions 7, 7' and the gear rim 8. The housings 13 and 14 or 13' and 14' for these stages are flanged to opposite sides of the collecting gear housing 10.

The number of drive shafts and pinions may also be chosen greater than two; similarly one can operate with only one drive shaft and one pinion. It is also possible to drive the individual drive shafts from a common drive motor, following which must then be provided suitable branching gearing.

Having described the invention, I claim:
1. A drive for a rotating drum, comprising at least one driving motor, and a toothed wheel which surrounds the neck of the drum and has at least one pinion in driving engagement therewith, wherein the improvement comprises, for each such pinion, two stages of reduction gearing arranged on axially opposite sides of the toothed wheel, the first stage being driven by the motor and the second stage being connected to drive the pinion, and a torsion shaft through which the first stage drives the second stage and which passes through the pinion.

(References on following page)

References Cited

UNITED STATES PATENTS

| | | | |
|---|---|---|---|
| 1,151,762 | 8/1915 | Day | 74—410 |
| 1,504,792 | 8/1924 | Smith | 74—410 |
| 1,551,565 | 9/1925 | Hodgkinson | 74—410 |
| 2,235,501 | 3/1941 | Kuhns | 74—410 |
| 2,868,033 | 1/1959 | Gaither | 74—411 X |
| 3,144,790 | 8/1964 | Davis et al. | 74—410 X |
| 3,232,137 | 2/1966 | Klovers. | |
| 3,303,713 | 2/1967 | Hicks | 74—410 X |
| 3,316,772 | 5/1967 | Jones | 74—410 |

FOREIGN PATENTS

| | | |
|---|---|---|
| 791,594 | 3/1958 | Great Britain. |
| 943,383 | 12/1963 | Great Britain. |

FRED C. MATTERN, Jr., *Primary Examiner.*

L. H. GERIN, *Assistant Examiner.*